Patented May 23, 1933

1,911,068

UNITED STATES PATENT OFFICE

CAMILLE DREYFUS, OF NEW YORK, N. Y., AND GEORGE SCHNEIDER, OF MONTCLAIR, NEW JERSEY, ASSIGNORS TO CELANESE CORPORATION OF AMERICA, A CORPORATION OF DELAWARE

METHOD OF MAKING ORGANIC ESTERS OF CELLULOSE

No Drawing. Application filed May 25, 1929. Serial No. 366,083.

This invention relates to the process of preparing organic esters of cellulose and relates more particularly to a method of removing part or all of the organic acids employed as diluent or solvent for the cellulose ester to be formed.

An object of our invention is to prepare organic esters of cellulose in an expeditious manner. A further object of our invention is to recover the diluents or solvents employed during the esterification of cellulose by an economical process. Other objects of our invention will appear from the following detailed description.

In the process of preparing organic esters of cellulose, the esterification of the cellulose is usually conducted in the presence of a substantial amount of a diluent or solvent for the ester of cellulose being formed. Thus in preparing cellulose acetate, cellulose is acetylated by treatment with acetic anhydride and a catalyst, such as sulfuric acid, in the presence of a large amount of glacial acetic acid as a solvent for the cellulose acetate that is formed. After completion of the acetylation, the resulting solution of cellulose acetate in glacial acetic acid is treated with a large excess of water, which dilutes the acetic acid to such an extent that the cellulose acetate precipitates. After removal of the precipitated cellulose acetate, there remains a relatively dilute solution of acetic acid. The recovery of the acetic acid in usable form from this dilute solution is a matter of great difficulty, since glacial acetic acid cannot be separated therefrom by ordinary methods of distillation.

We have found that if instead of precipitating the cellulose acetate from solution in the strong acetic acid in which it is formed by the addition of large amounts of water, the acetic acid is removed by distillation, the acetic acid may be recovered either in the form of glacial acetic acid, or in such concentrated form that it may be fractionally distilled to produce glacial acetic acid. This is due to the fact that while relatively dilute aqueous solutions of acetic acid cannot be concentrated by ordinary methods of distillation, concentrated solutions of acetic acid may be distilled to form glacial acetic acid.

In carrying out our invention we prepare organic esters of cellulose by esterifying cellulose in any suitable form by means of any esterifying agent in the presence of a suitable catalyst and an organic acid as solvent in any suitable manner. After completion of the esterification of the cellulose, there results a homogeneous viscous solution and water may then be added in amounts sufficient to convert any acetic anhydride remaining into the corresponding acid. Now according to our invention, this homogeneous solution is subjected to distillation, either at this stage or after the same has been subjected to a hydrolysis treatment known as ripening, to recover the organic acid employed as diluent or solvent directly from the esterifying mixture.

Our invention may be employed in the making of any suitable organic ester of cellulose such as cellulose acetate, cellulose formate, cellulose propionate and cellulose butyrate. Cellulose in any suitable form such as cotton, cotton linters, wood pulp (either sulphite or soda pulp), reconstituted cellulose, etc., may be employed in making the cellulose esters. This cellulose may be activated by pretreatment with lower aliphatic acids or by treatment with alkali, etc. The esterifying agent may be acetic anhydride, formic acid, propionic anhydride, or butyric anhydride, depending upon the ester of cellulose to be formed. The esterification is carried out in the presence of a suitable catalyst such as sulfuric acid, zinc chloride, sodium bisulphate, methyl sulphate. While we prefer to employ acetic acid as the diluent or solvent for the cellulose esters to be formed, any other suitable organic acid such as propionic acid or butyric acid may be employed.

While we prefer first to hydrolize or ripen the cellulose ester by the addition of a suitable quantity of water to the primary solution resulting from the esterifying process and permitting the same to stand at suitable temperatures for such time until the cellulose ester develops the desired solubility characteristics, prior to subjecting the same to distillation to recover the organic acid employed as solvent or diluent, our invention is not limited thereto. The distillation of the organic acid may be carried out immediately after the completion of the esterification process, or at any time subsequent thereto.

The distillation of the organic acid from the solutions of the cellulose esters may be carried out at any suitable temperatures and at any suitable pressures ranging from superatmospheric pressure, through atmospheric pressure to absolute vacuum. However, we prefer to employ reduced pressure in order to lower the temperature at which the distillation is conducted so as to avoid danger of decomposition. If desired, air or any inert gas may be injected into the mass to assist the distillation.

While all of the organic acid may be distilled completely from the esterifying mixture, we prefer to interrupt distillation while some of the acid still remains in the mixture, and preferably in such amounts as to maintain the cellulose ester in solution. In other words, we prefer to remove from the esterifying mixture ony a restricted quantity of organic acid whereby a sufficient amount of organic acid remains in the mixture to keep the cellulose ester in solution.

In one form of our invention we distill from the esterifying mixtures only such amount of organic acid as to leave behind in the mixture an amount of organic acid equivalent to that amount of the anhydride of the acid that is required for the next charge. The solution of the acid and the cellulose ester remaining from the distillation is then treated with a sufficient quantity of water to precipitate the cellulose ester, and the dilute solution of the acid is separated and converted into the anhydride. This may be done by any of the well known methods. In this manner an economical cycle of operation is obtained, since only such amount of anhydride is formed as is required for the process of esterification.

Where a catalyst, such as sulfuric acid, that has a strong degrading action on cellulose compounds is employed in the esterifying process, we prefer to neutralize the same by the addition of an alkali or alkaline salt, such as the carbonate or bicarbonate of sodium, potassium or ammonium, or the sodium, potassium or ammonium salt of the organic acid employed as diluent or solvent, prior to distillation.

The organic acid recovered by the distillation process may be purified in any suitable manner such as by fractional distillation, and may then be employed in the esterification of further amounts of cellulose or for any other purpose.

It will be seen that by our process, the organic acids employed as solvents or diluents in the esterification of cellulose may be recovered very economically. Moreover the organic esters of cellulose treated by our process have improved properties in many respects.

In order further to illustrate our invention but without being limited thereto, the following specific examples are given.

Example I 100 parts of cellulose such as cotton linters, with or without previous preparation such as activation with acid and/or alkalies, are added to a mixture of 400 parts of acetic anhydride and 600 parts of glacial acetic acid, containing 10 to 30 parts sulfuric acid, the parts being by weight. The acetylation of the cellulose is preferably carried out with cooling. After the reaction upon the cellulose is completed, 20 to 50 parts of water are added and the mass is permitted to hydrolize until the cellulose actate is completely soluble in acetone.

At this point a sufficient amount of sodium acetate or sodium bicarbonate is added to completely neutralize the sulfuric acid present, and the mass is then subjected to distillation in any suitable device under sub-atmospheric pressure, preferably with stirring, to vaporize the acetic acid until substantially 80 parts or less of acetic acid remains in the mass. The vapors of acetic acid are condensed and the condensed acetic acid may be employed directly, or may be subjected to fractional distillation to recover the same in the substantially pure form of glacial acetic acid.

The residue of the distillation, containing the cellulose acetate and some acetic acid, is then treated by an addition of water which is thoroughly mixed in, and the cellulose acetate that precipitates is removed from the dilute acetic acid and may be purified in any desired manner.

Example II

The following is an example of a mode of carrying out our process wherein a balance is maintained so that the amount of acetic acid that is permitted to remain undistilled from the acetylation mixture is just sufficient to correspond to the acetic anhydride required for the acetylation of a next charge of similar size.

The acetylation of the cellulose is conducted precisely as in Example I, and the acetic acid is distilled from the acetylated mixture in the same manner as described in Example I with the exception that the distillation is stopped at the point where slightly more than 235 to 470, say 270, parts of acetic acid remain in the acetylation mixture. To the acetylation mixture, water is added with vigorous mixing until the cellulose acetate precipitates, and the cellulose acetate is separated from the dilute acetic acid. This dilute acid is then neutralized with an alkaline material, say sodium carbonate, the resulting solution of sodium acetate evaporated to produce anhydrous sodium acetate, and this sodium acetate is reacted upon in any well known manner to form acetic anhydride, which will equal in amount the 200 to 400 parts required for the next charge, thus completing the cycle.

It is to be understood that the foregoing detailed description is given merely by way of illustration, and that many variations may be made therein, without departing from the spirit of our invention.

Having described our invention, what we claim and desire to secure by Letters Patent is:

1. The process of preparing cellulose acetate comprising acetylating cellulose by means of acetic anhydride in the presence of acetic acid and a catalyst, subjecting the resulting mixture to distillation to remove part of the acetic acid and interrupting the distillation when an amount of acetic acid substantially corresponding to the amount of acetic anhydride originally employed remains in the mixture.

2. The process of preparing cellulose acetate comprising acetylating cellulose by means of acetic anhydride in the presence of acetic acid and a catalyst, subjecting the resulting mixture to distillation to remove part of the acetic acid, interrupting the distillation when an amount of acetic acid substantially corresponding to the acetic anhydride originally employed remains in the mixture, adding water to the mixture to precipitate the cellulose acetate, removing the cellulose acetate from the resulting aqueous solution of acetic acid and converting such aqueous solution of acetic acid into acetic anhydride.

3. The process of preparing cellulose acetate comprising acetylating cellulose by means of acetic anhydride in the presence of acetic acid as diluent and sulfuric acid as catalyst, adding an amount of water to the resulting mixture and permitting the same to hydrolize, subjecting the resulting mixture to distillation to remove part of the acetic acid and interrupting the distillation when an amount of acetic acid substantially corresponding to the amount of acetic anhydride originally employed remains in the mixture.

4. The process of preparing cellulose acetate comprising acetylating cellulose by means of acetic anhydride in the presence of acetic acid as diluent and sulfuric acid as catalyst, adding an amount of water to the resulting mixture and permitting the same to hydrolize, subjecting the resulting mixture to distillation to remove part of the acetic acid, interrupting the distillation when an amount of acetic acid substantially corresponding to the amount of acetic anhydride originally employed remains in the mixture, adding water to the mixture to precipitate the cellulose acetate that has been formed, removing the cellulose acetate from the resulting aqueous solution of acetic acid and converting the aqueous solution of acetic acid into acetic anhydride.

In testimony whereof, we have hereunto subscribed our names.

CAMILLE DREYFUS.
GEORGE SCHNEIDER.